United States Patent [19]

Qureshi

[11] 4,358,853
[45] Nov. 9, 1982

[54] DIGITAL MODEM TRANSMITTER

[75] Inventor: Shahid U. H. Qureshi, Natick, Mass.

[73] Assignee: Codex Corporation, Mansfield, Mass.

[21] Appl. No.: 228,880

[22] Filed: Jan. 22, 1981

[51] Int. Cl.³ .................... H04B 1/04; H04B 12/00
[52] U.S. Cl. .................... 375/60; 332/10; 375/39; 375/43
[58] Field of Search .............. 375/39, 43, 60, 61; 455/46, 47, 59, 60, 61, 109; 332/10, 44, 45; 364/514

[56] References Cited

U.S. PATENT DOCUMENTS

| | | | |
|---|---|---|---|
| 3,128,342 | 4/1964 | Baker | 375/67 |
| 3,611,143 | 10/1971 | Van Gerwen | 375/39 |
| 3,825,834 | 7/1974 | Stuart et al. | 375/61 |
| 3,887,768 | 6/1975 | Forney, Jr. et al. | 375/42 |
| 3,988,540 | 10/1976 | Scott et al. | 375/53 |
| 4,092,618 | 5/1978 | Guidoux | 333/70 T |
| 4,107,470 | 8/1978 | Maruta | 375/43 |
| 4,123,710 | 10/1978 | Stuart et al. | 375/39 |
| 4,313,202 | 1/1982 | Kameya | 375/15 |

Primary Examiner—Marc E. Bookbinder

[57] ABSTRACT

A data modulator for transmitting a first sequence of data symbols at a symbol rate of 1/T, the modulator being characterized as having a carrier frequency of $f_c$ Hz and the data symbols being denoted as $x(kT)$, where $x(kT)$ is a real or complex number and k is the time index of the kth symbol, featuring, in one aspect, modulated signal generating means for receiving the first sequence and generating, in response thereto and at the symbol rate, a second sequence of complex-valued signals $y(kT)$, the signal $y(kT)$ representing the complex number $y(kT)=x(kT)\cdot\exp(j2\pi f_c kT)$, where $j=\sqrt{-1}$, and filter means for receiving the second sequence and generating, in response thereto, a third sequence of real-valued signals, at a rate higher than the symbol rate, the third sequence representing linear combinations of the real and imaginary parts of the second sequence of complex-valued signals $y(kT)$.

21 Claims, 9 Drawing Figures

DIGITAL MODEM TRANSMITTER

FIELD OF THE INVENTION

This invention relates to modem transmitters, devices which generate a modulated carrier signal representative of a stream of digital data.

BACKGROUND OF THE INVENTION

The conventional modem transmitter consists of an encoder, filter, and modulator, connected in that order. The encoder takes an integral number of m bits at a time and encodes them into symbols. Thus, if the bit rate is R bits per second, the encoder groups the bits into R/m symbols per second, each symbol being transmitted in a time interval T=m/R seconds, called the signalling or symbol interval. For each of the possible $2^m$ combination of bits that make up a symbol, the encoder generates a distinct signal; the set of all possible $2^m$ signals is typically referred to as the signal constellation. If the type of modulation desired is pulse amplitude modulation, then each signal is a pulse, of an amplitude determined by the symbol, e.g., amplitudes of $-3$, $-1$, 1, and 3 for quaternary transmission (m=2, $2^m$=4). This is called one-dimensional modulation since the symbol determines one parameter, in this case amplitude. For quadrature amplitude (or combined phase and amplitude) modulation, a two-dimensional signal constellation is required. The parameters of the signal are often referred to as the "real" and "imaginary" parts of a complex-valued signal. For instance, for 4-phase modulation, the signal points may be located at (1,1), (1, $-1$), ($-1$, $-1$), and ($-1$, 1). In general, a one-dimensional or amplitude modulation system is a subset of (i.e., may be produced as a special case of) quadrature amplitude modulation.

In a conventional analog transmitter, the digital values of the symbol sequence are converted to analog voltage pulses and then filtered to limit the signal spectrum to the desired band having a maximum frequency less than the carrier frequency. The filter output is then multiplied with the carrier signal to produce the modulated signal.

In two-dimensional modulated systems (for which an exemplary transmitter structure is depicted in FIG. 1 of Forney, Jr. et al., U.S. Pat. No. 3,887,768), the real and imaginary parts of the complex-valued symbol sequence may be separately converted to a pair of analog pulse streams. The two pulse streams are then filtered by identical analog filters. The output of the filter with "real" input is then modulated by a cosine wave at the carrier frequency, while the output of the other filter is modulated by a sine (i.e., 90° out of phase) wave of the same frequency. The "in phase" and "quadrature" modulated signals are superimposed to create the quadrature amplitude modulated (QAM) signal for transmission.

Stuart et al., U.S. Pat. No. 4,123,710, shows how a similar structure may be used to produce a partial response QAM transmitter, by the inclusion of partial response encoders.

Conventional digital implementations are similar in concept. However, the filtering and modulation operations are accomplished on digital sample streams. Finally, the digital sample sequence representing the modulated carrier signal is converted to analog pulses and filtered to generate the analog waveform.

It is well known that frequency-domain filtering causes a spreading in the time domain, whereby the signal associated with each symbol interval spills over into other symbol intervals. In Baker, U.S. Pat. No. 3,128,343, a similar effect to filtering in the frequency domain is accomplished by time domain signal generation techniques. Two carrier waves are generated, one of which has a phase indicative of the current symbol interval, while the other is generated with the phase to be assigned to the succeeding symbol interval. Both carrier waves are amplitude modulated by raised cosine envelopes, such that, when the amplitude of one carrier wave is at its maximum, the amplitude of the other carrier wave is simultaneously at its minimum. Superposition of the two resulting wave forms produces the line signal.

Scott et al. U.S. Pat. No. 3,988,540 shows a transmitter structure for phase modulation, in which a particular bandpass filter characteristic is selected; then, knowing the carrier frequency, symbol interval and baseband symbol alphabet, the response of the selected filter to each possible baseband symbol is found, assuming that the response ceases ringing after a set number of symbol intervals. Samples of each possible response are stored in a read only memory. Thus, by continuously adding the response samples of the current and a set number of additional symbol intervals (during which ringing is assumed to continue), a composite sample stream is obtained, which represents samples of the final modulated and filtered waveform.

In Stuart et al., U.S. Pat. No. 3,825,834, a modem transmitter is described in which single sideband amplitude modulation (SSB) is accomplished by first passing the data encoded baseband symbols through a Hilbert transform filter pair, next analog modulating the resulting phase split signals, respectively, onto quadrature carriers, and finally adding the two modulated signals to produce the line signal.

A pending U.S. patent application, Kameya, Ser. No. 136,919, filed Apr. 3, 1980, discloses use of a digital phase splitting (i.e., Hilbert transform) filter pair in a double sideband modem receiver.

SUMMARY OF THE INVENTION

I have discovered that a digital QAM modem transmitter may be implemented by providing a complex digital modulator followed by a Hilbert transform filter pair. In such an arrangement, the number of computations required to effect modulation is significantly reduced. Additionally, phase and amplitude preequalization of the transmitted line signal may be accomplished, with no increase in computational complexity. Further, if such a transmitter structure is employed to transmit either a pure phase or QAM signal structure and if certain integer relationships exist between the carrier frequency and the symbol interval, then, in the case of pure phase modulation, the modulation procedure may be coalesced into the encoder table look-up procedure (and thereby eliminated), while in the case of QAM, the modulator may be replaced with a memory element, from which the appropriate modulated carrier samples are sequentially accessed.

In one aspect, the invention features modulated signal generating means for receiving a first sequence of data symbols x(kT), where x(kT) is a real or complex number and k is the time index of the kth symbol, and generating, in response thereto and at a symbol rate of 1/T, a second sequence of complex-valued signals y(kT), the signal y(kT) representing the complex number $y(kT)=x(kT)\cdot\exp(j2\pi f_c kT)$, where $j=\sqrt{-1}$, and filter means for receiving the second sequence and generating, in response thereto, a third sequence of real-valued signals, at a rate higher than the symbol rate, the third sequence representing linear combinations of the real and imaginary parts of the second sequence of complex-valued signals $y(kT)$.

In another aspect the invention features modulated signal generating means for receiving a first sequence of data symbols $x(kT)$, where $x(kT)$ is a real or complex number and k is the time index of the kth symbol, and generating, in response thereto and at a symbol rate of $1/T$, a second sequence of complex-valued signals $y(kT)$, the signal $y(kT)$ representing the complex number $y(kT)=x(kT)\cdot\exp(j2\pi f_c kT)$, where $j=\sqrt{-1}$, means for converting the second sequence into a pair of analog signals representative of the real and imaginary parts of the second sequence, and filter means for thereafter filtering and combining the pair of analog signals to generate a composite analog signal, the composite analog signal representing a linear combination of the pair of analog signals.

In preferred embodiments, the modulated signal generating means includes means for generating successive complex-valued digital signals whose values are equal to successive samples of a complex exponential with a frequency equal to the carrier frequency and means for multiplying successive signals of the first sequence with the successive complex exponential samples; the carrier frequency is $f_c$, $f_c T=n/k$, where n and k are relatively prime integers, each symbol of the first sequence of data symbols is one of a set of $2^m$ possible data symbols, each digital signal of the second sequence has one of no more than k times $2^m$ possible complex values, and said modulated signal generating means includes means for storing no more than k times $2^m$ complex-valued digital signals and means for selecting, responsive to each data symbol of the first sequence, one of the stored complex-valued digital signals such that the selected digital signals consecutively form the second sequence; only the phase of the carrier is modulated in accordance with the first sequence of data symbols, the carrier frequency is $f_c=n/2^m$, n being a positive integer and $2^m$ being the number of possible phase shifts of said carrier, each signal of the second sequence has one of no more than $2^m$ possible complex values, and the modulated signal generating means includes means for storing and selecting, responsive to each data symbol of the first sequence, one of the $2^m$ possible complex values, the selected complex values consecutively forming the second sequence; the filter means is a complex digital filter and includes digital circuitry for successively storing a predetermined number of the most recent signals of the second sequence, multiplying the real components of the stored signals, respectively, by a predetermined number of a first set of coefficients, multiplying the imaginary components of the stored signals, respectively, by a predetermined number of a second set of coefficients, and combining the products of the multiplications to produce the third sequence of real-valued signals; the filter means is a complex sampled-data filter and includes means for sampling the pair of analog signals at successive discrete instants of time, means for storing electrical charges whose magnitudes are representative of the amplitudes of a predetermined number of the most recent samples of the pair of analog signals at the instants of time, means for scaling the magnitudes of the real components of the stored charges, respectively, by predetermined number of a first set of tap gains, scaling the imaginary components of the stored charges, respectively, by a predetermined number of a second set of tap gains, and combining the products of the scaling operations to produce the composite analog signal; the values of the first and second sets of coefficients or tap gains are chosen such that the frequency spectrum of the third sequence or composite analog signal has an amplitude characteristic that does not exhibit even symmetry about the carrier frequency and a phase characteristic that does not exhibit odd symmetry about the carrier frequency; means are provided for selectively altering the values of the first and second sets of coefficients or tap gains to cause the amplitude characteristic to exhibit even symmetry about the carrier frequency and to cause the phase characteristic to exhibit odd symmetry about the carrier frequency; and the phase characteristic of the third sequence or composite analog signal varies linearly with respect to frequency.

DESCRIPTION OF THE PREFERRED EMBODIMENTS

We turn now to a description of the preferred embodiments, after first briefly describing the drawings.

STRUCTURE AND OPERATION

Figure 1:
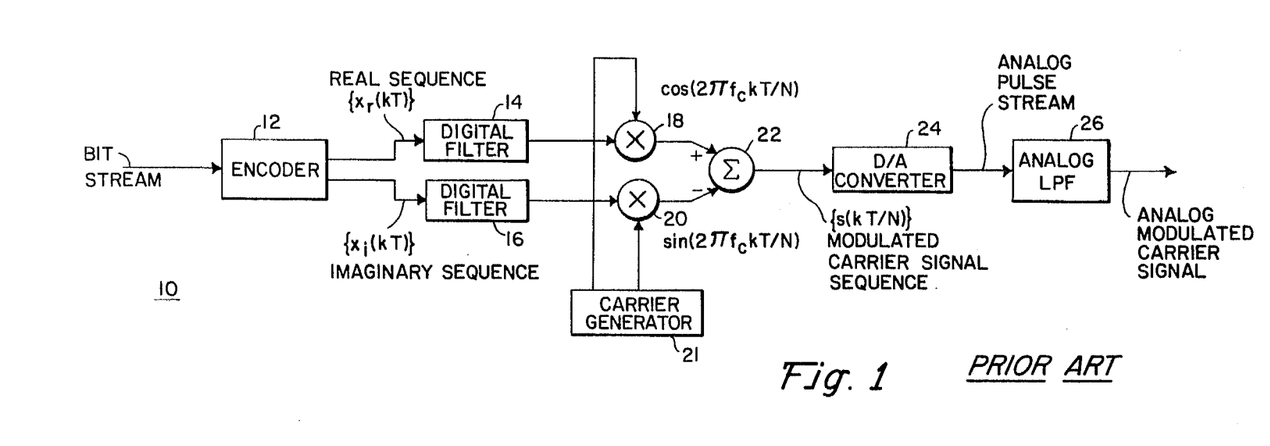
FIG. 1 is a block diagram of a prior art digital modem transmitter.

Referring now to FIG. 1, a conventional prior art digital QAM transmitter 10 has an encoder 12, which receives as input a stream of digital data and, once every symbol interval of T seconds, provides as output one of $2^m$ complex symbols $x(kt)=x_r(kT)+jx_i(kT)$, where m is the number of bits which are encoded into each symbol interval and $j=\sqrt{-1}$. The real and imaginary parts of the symbol sequence produced by encoder 12 pass to identical low pass digital filters 14 and 16, which provide baseband signal shaping and will, therefore, normally have a cutoff frequency of $1/2T$, in accordance with Nyquist's criterion.

Filters 14 and 16 take, and operate on, samples of the output of encoder 12, the filter sampling frequency being higher than the symbol rate of the modem, i.e., typically N/T, where N is the number of samples per symbol, an integer greater than 1. The outputs of filters 14 and 16, which are similarly produced at the rate N/T, are provided as input to multipliers 18 and 20 where they are multiplied (i.e., modulated) by successive discrete samples of the quadrature carrier waveforms cos ($2\pi f_c kT/N$) and sin ($2\pi f_c kT/N$) ($f_c$ Hz being the carrier frequency), the carrier samples being generated by a carrier generator 21. The samples of the filtered and now-modulated quadrature carrier waveform are then combined in a subtractor 22, where the sine component is subtracted from the cosine component.

The output of subtractor 22, a sample sequence of real-valued modulated and filtered carrier signals {s(kT/N)}, occurring again at a rate of N/T, is provided as input to a digital-to-analog (D/A) converter 24, where each digital sample s(kT/N) is converted to an analog pulse, whose amplitude is determined by the value of its corresponding digital sample.

The resulting analog signal passes through an analog low pass filter 26, which removes high frequency components (around multiples of the sampling frequency) inherent in the sample-produced data waveform, thereby producing a smooth analog signal ready for application to a transmission medium, e.g., a telephone line.

Filters 14 and 16 are typically identical nonrecursive (or transversal) filters. Assuming each has M coefficients p(mT/N), for m=0, 1, ..., M−1, spaced T/N seconds apart in time, a modulated signal sample may be expressed in terms of the symbol sequence x(kT) as follows:

$$s(kT/N) = \left[\sum_n x_r(nT) \cdot p(kT/N - nT)\right] \cdot \cos(2\pi f_c kT/N) - \left[\sum_n x_i(nT) \cdot p(kT/N - nT)\right] \cdot \sin(2\pi f_c kT/N),$$

where the summation extends over the M filter coefficients and each symbol is expressed as the summation of a number of products of real numbers.

However, each symbol may also be expressed as the real part of a complex number as follows:

$$s(kT/N) = Re \sum_n [x(nT) \cdot p(kT/N - nT) \cdot \exp(j2\pi f_c kT/N)]$$

where Re denotes the real part of a complex number (the fact that a complex number results being due to the presence of a complex signal x(nT) and a complex exponential within the expression) and the summation again extends over the M filter coefficients.

At this point, the following characteristics of the prior art transmitter of FIG. 1 should be noted.

1. Since, during each symbol interval T, filters 14 and 16 provide N samples to modulators 18 and 20, carrier generator 21 must generate the quadrature carrier signal samples cos ($2\pi f_c kT/N$) and sin ($2\pi f_c kT/N$) at the same rate, i.e., N times each symbol interval.

2. If it is desired that the final modulated and filtered carrier signal have an amplitude characteristic which exhibits even symmetry and a phase characteristic which exhibits odd symmetry about the carrier frequency $f_c$, then the coefficients p(mT/N) will be real-valued. If, on the other hand, the transmitter is to have the capability to alter these forms of symmetry, as for example, where one wishes to pre-equalize (predistort) the transmitted signal to compensate for distortion introduced by non-ideal analog filter characteristics or a statistical average of expected channel characteristics, then the coefficients p(mT/N) must be complex, a requirement which doubles the number of computations that must be performed during each symbol interval.

Figure 2:
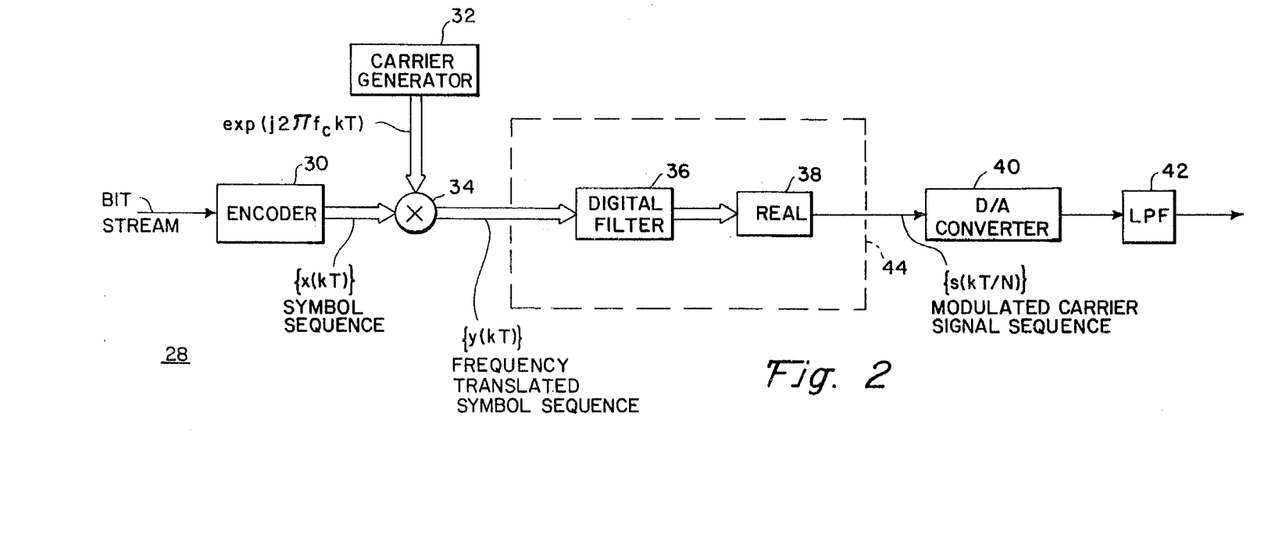
FIG. 2 is a functional block diagram, illustrating certain concepts employed in a digital modem transmitter embodying the invention.

Referring now to FIG. 2, which functionally illustrates certain concepts of the invention, a transmitter 28 contains an encoder 30 of conventional design (e.g., like encoder 12 of FIG. 1), which accepts an incoming stream of digital data, structuring it into groups of m bits and providing an output, once every symbol interval of T seconds, a complex symbol value x(kT)=$x_r$(kT)+j$x_i$(kT), there being $2^m$ such symbol values possible (where m is the number of bits encoded into each symbol interval).

In FIG. 2, as well as all other figures, a block arrow indicates a complex-valued digital stream, while a single-line arrow indicates a real-valued digital stream.

A carrier generator 32 generates successive sample values of the complex exponential function exp (j$2\pi f_c kT$), producing these samples at the rate of 1/T, where T is the symbol interval duration of the modem.

The outputs of encoder 30 and carrier generator 32 (two streams of complex values expressed in digital form, both occurring at a rate of 1/T) are provided as inputs to a complex multiplier 34, which, for each pair of complex values presented, produces a complex output y(kT), the product of x(kT) and exp (j$2\pi f_c kT$).

The resulting sequence of values {y(kT)} corresponds to translation of the unfiltered baseband frequency spectrum of {x(kT)} to passband. Thus, whereas the complex-valued symbol sequence {x(kT)} has a frequency spectrum X(f), the complex-valued symbol sequence {y(kT)} has a frequency spectrum given by X(f−$f_c$), $f_c$ being the carrier frequency.

Bandpass filter 36, a complex nonrecursive digital filter, samples the output of multiplier 34 at a rate of N/T samples per second and produces a complex filtered output at the same rate. The M complex coefficients q(mT/N), for m=0, 1, ... M−1, of filter 36 are spaced T/N seconds apart in time and their values are given by:

$$q(mT/N) = p(mT/N) \cdot \exp(j2\pi f_c mT/N)$$

where p(mT/N), for m=0, 1, ..., M−1, are the coefficients of both filters 14 and 16 of the prior art transmitter structure of FIG. 1, i.e., multiplication of the prior art baseband real coefficients p(mT/N) by samples of a complex exponential produces the complex filter coefficients q(mT/N).

A real component selector 38 receives the complex output of filter 36 at a rate of N/T, selecting only the real part of this output (i.e., ignoring the imaginary component in the filter output), to produce (at a rate N/T) a real-valued modulated (and filtered) carrier sample stream {s(kT/N)}. As in the prior art transmitter structure of FIG. 1, the sample stream {s(kT/N)} passes to a digital-to-analog converter 40, which produces analog pulses, whose amplitudes are determined by the values s(kT/N). Also similarly, the analog pulses are subsequently smoothed by passage through an analog low pass filter 42 to produce a line-ready signal.

The output from selector 38, expressed in terms of coefficients q(mT/N) is:

$$s(kT/N) = \text{Re} \sum_n [x(nT) \cdot \exp(j2\pi f_c nT) \cdot q(kT/N - nT)],$$

where Re denotes selection of only the real part of the complex expression, which is precisely the function performed by real-value selector 38.

When this expression for s(kT/N) is combined with the above noted restriction on the coefficients q(mT/N), namely:

$$q(mT/N) = p(mT/N) \cdot \exp(j2\pi f_c mT/N),$$

the following expression for s(kT/N) is obtained.

$$s(kT/N) = \text{Re} \sum_n [x(kT) \cdot p(kT/N - nT) \cdot \exp(j2\pi f_c kT/N)].$$

Reference back to the discussion of FIG. 1 will show that this is the same modulated and filtered carrier signal sample as was produced by the prior art transmitter structure of FIG. 1.

It should be noted that filter 36 produces a complex-valued output, once every T/N seconds, which is the sum of the individual complex products y(kT) and q(mT/N), produced at each time slot. The product of two complex numbers, of the form $y = y_r + jy_i$ and $q = q_r + jq_i$, is $y_r q_r - y_i q_i + j(y_r q_i + y_i q_r)$. Since the imaginary components do not contribute to the final signal (i.e., they are functionally ignored by real-value selector 38), they need not be computed in the first place. An implementation, in which only the real part of the complex output of filter 36 is generated, is shown in FIG. 3, to which we now turn.

Figure 3:
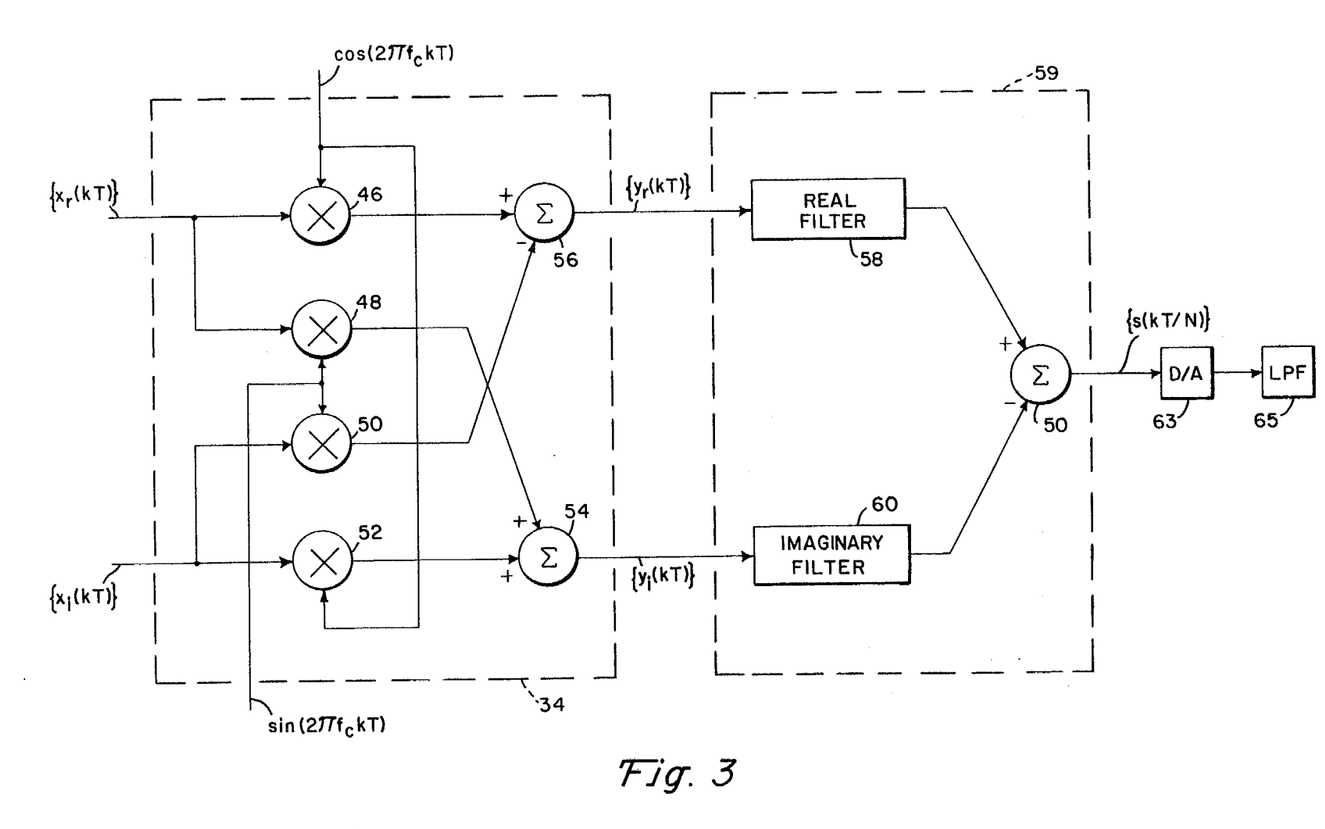
FIG. 3 is a block diagram of a specific implementation of the complex modulator and complex digital filter of a digital modem transmitter embodying the invention.

A D/A converter 63 and an analog low pass filter 65 are included, within the FIG. 3 structure, and operate substantially like their FIG. 1 and FIG. 2 counterparts. Also shown in FIG. 3 is a more detailed block diagram of modulator 34, which includes multipliers 46, 48, 50, and 52, an adder 54 and a subtractor 56. Modulator 34 operates (as indicated schematically in FIG. 3), once each symbol interval of T seconds, on the complex baseband signal $x(kT) = x_r(kT) + jx_i(kT)$, to produce the corresponding modulated carrier sample $y(kT) = y_r(kT) + jy_i(kT)$, where $y_r(kT)$ and $y_i(kT)$ are real numbers given by:

$$y_r(kT) = x_r(kT) \cdot \cos(2\pi f_c kT) - x_i(kT) \cdot \sin(2\pi f_c kT)$$

and $$y_i(kT) = x_r(kT) \cdot \sin(2\pi f_c kT) + x_i(kT) \cdot \cos(2\pi f_c kT).$$

Referring momentarily back to FIG. 2, it will be seen that digital filter 36 and real-value selector 38 are there referenced together as a circuit 44, which receives a complex-valued sample stream and produces, therefrom, a real-valued output sample stream, which corresponds to a bandpass filtered version of the input stream. In FIG. 3, a circuit 59, consisting of parallel digital filters 58 and 60 and a subtractor 62, replaces circuit 44 and performs this same function. However, whereas in circuit 44 the entire complex product is produced, the imaginary part of which is then discarded, in circuit 59, only the real part of the complex product is produced, resulting in a computational savings.

The real and imaginary component sample streams output from modulator 34 (i.e., $\{y_r(kT)\}$ and $\{y_i(kT)\}$) are provided as inputs to filters 58 and 60. Whereas $\{y(kT)\}$, the complex sample stream output of modulator 34, is produced at the symbol rate of 1/T, filters 58 and 60 sample and operate upon this output at the higher rate of N/T, i.e., N samples per symbol interval. Filters 58 and 60 each have M real-valued coefficients, $q_r(mT/N)$ and $q_i(mT/N)$, respectively (for m = 0, 1, ..., M−1) which are, respectively, the real and imaginary parts of the coefficients of complex filter 36, described above in conjunction with FIG. 2.

Figure 4:
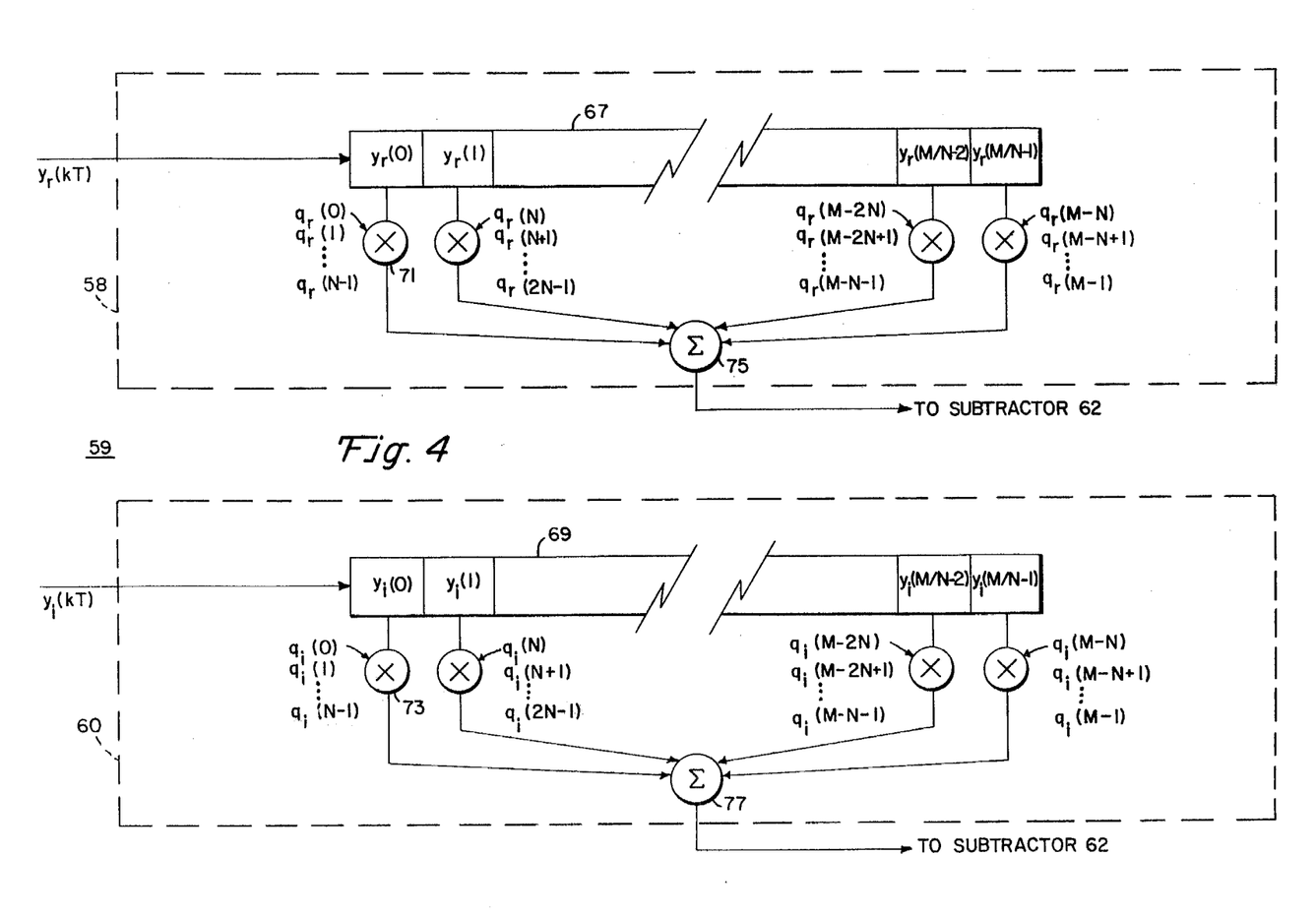
FIG. 4 is a block diagram which illustrates, in greater detail, the digital filter of FIG. 3.

In order to reduce the number of products which must be produced and accumulated by filters 58 and 60 (every time interval of T/N seconds), it is preferred that N−1 of the samples taken during each symbol interval T be assigned the value zero, with only a single remaining sample of each symbol interval having the value of the complex modulated carrier sample y(kT), produced by modulator 34 during that symbol interval. Since the N−1 zero-valued samples do not contribute to the output of filters 58 and 60 (i.e., the product resulting from their multiplication with a filter coefficient would invariably be zero), the N−1 zero-valued samples need not be stored in the first place. Realization of this fact points to a method for reducing, from M to [M/N] (where the brackets [ ] indicate the next largest integer value of the enclosed term), the number of modulated carrier samples which must be stored in and the number of products which must be produced and accumulated by filters 58 and 60. This method is illustrated in FIG. 4, to which we now turn. Note: Henceforth, we assume M is a multiple of N and, thus, write M/N instead of [M/N].

Filters 58 and 60 each contain M/N unit delay lines 67 and 69, respectively, each delay unit of which has an associated multiplier, e.g., multipliers 71 and 73. Accumulators 75 and 77 receive and accumulate the products produced in the multipliers associated with delay lines 67 and 69, respectively.

Once every symbol interval of T seconds, the real and imaginary components of the modulated carrier sample (i.e., $y_r(kT)$ and $y_i(kT)$), produced by modulator 34, are entered into the first delay units of delay lines 67 and 69, respectively; simultaneously, all M/N already stored samples shift forward, with the most ancient sample being discarded. Thereafter, during the remainder of the current symbol interval, N filter outputs are produced, as follows.

N consecutive sets of filter coefficients (which are typically accessed from a ROM) are presented at the multipliers associated with delay lines 67 and 69. Each set of filter coefficients is an M/N subset of the total number of M coefficients. Thus, at the multipliers associated with delay line 67, the following sets of coefficients are consecutively presented:

$$q_r(0), q_r(N), \ldots, q_r(M - N)$$

$$q_r(1), q_r(N + 1), \ldots, q_r(M - N + 1)$$

$$q_r(N - 1), q_r(2N - 1), \ldots, q_r(M - 1).$$

Each set of coefficients presented is multiplied, respectively, by the M/N samples contained in delay line 67, with the products being summed in accumulator 75, to yield N consecutive filter 58 outputs.

Similarly, N consecutive sets of imaginary coefficients are presented at the multipliers associated with delay line 69, each set of coefficients being an M/N subset of the total number of M imaginary coefficients, and the consecutive sets of coefficients being given by:

$$q_i(0), q_i(N), \ldots, q_i(M-N)$$

$$q_i(1), q_i(N+1), \ldots, q_i(M-N+1)$$

$$\vdots$$

$$q_i(N-1), q_i(2N-1), \ldots, q_i(M-1).$$

In a likewise similar manner, the N resulting sets of M/N products are summed to yield N consecutive filter 60 outputs, spaced evenly over a symbol interval T.

The sample stream outputs of filters 58 and 60, which are produced at a rate N/T, are then supplied to subtractor 62, which subtracts each output of filter 60 from the corresponding filter 58 output, to produce a real-valued digital signal sample stream $\{s(kT/N)\}$, representative of the successive amplitudes of the desired modulated carrier signal. The value of each successive $s(kT/N)$ may be expressed as:

$$s(kT/N) = \sum_n [y_r(nT) \cdot q_r(kT/N - nT) - y_i(nT) \cdot q_i(kT/N - nT)].$$

It may be seen that, in the transmitter of FIG. 3:

1. The quadrature carrier samples $\cos(2\pi f_c kT)$ and $\sin(2\pi f_c kT)$ (which together determine the carrier sample, i.e., $\exp j\theta = \cos\theta + j\sin\theta$) need be produced only once per symbol interval, rather than N times, as in the prior art transmitter structure of FIG. 1.

2. During each symbol interval, the number of multiplications required of modulator 34 is 4 (the number of multiplications required to produce the product of two complex numbers), whereas, in the FIG. 1 transmitter, 2N multiplications must be performed at multipliers 18 and 20, during the same period (N being typically greater than 2).

3. The number of computations per symbol interval required of circuit 59 in FIG. 3 is the same as that required of filters 14 and 16 of FIG. 1, assuming that the FIG. 1 filter coefficients $p(mT/N)$ are real-valued (and assuming M coefficients in both cases). As discussed above, however, if pre-equalization is desired, the FIG. 1 filter coefficients must be complex-valued, which doubles the number of computations required per symbol interval. On the other hand, the FIG. 3 filter coefficients $q(mT/N)$ are already complex (i.e., $q(mT/N) = q_r(mT/N) + q_i(mT/N)$) and, thus, pre-equalization may be accomplished without increasing the number of computations required per symbol interval.

The modulated and filtered signal stream $\{s(kT/N)\}$ will exhibit a linear phase spectral characteristic (i.e., its phase will vary linearly with respect to frequency), if the real and imaginary components of the filter coefficients $q(mT/N)$ have, respectively, even and odd symmetry over the time spans of filters 58 and 60.

Thus far, the preferred embodiment has been characterized as utilizing nonrecursive digital filters. However, the concept is by no means limited to such an implementation but may be easily extended to permit the use of recursive digital filters. A common method in the design of recursive digital filters is to first determine the desired frequency response characteristics and then design a recursive filter which approximates this response to a desired degree of fit. Thus, it is appropriate to investigate the required spectral response characteristics of filters 58 and 60.

In general terms, it is sufficient that filter 58 have zero response to DC and that the impulse response of filter 60 be the Hilbert transform of the impulse response of filter 58 (i.e., that filters 58 and 60 form a "Hilbert transform pair"). Should nonrecursive filters be used, these conditions are met by the coefficient values for $q_r(mT/N)$ and $q_i(mT/N)$ described above.

If the frequency response of filter 58 is $Q(f)$, for $-N/2T < f \leq N/2T$, and $Q(f) = 0$, for $f = 0$, then the frequency response $\hat{Q}(f)$ of filter 60, according to the invention, is given by:

$$\hat{Q}(f) = \begin{cases} -jQ(f), & 0 < f \leq N/2T, \\ jQ(f), & -N/2T < f < 0, \\ 0, & f = 0. \end{cases}$$

The spectrum of the modulated sample sequence $\{y(kT)\} = \{y_r(kT)\} + j\{y_i(kT)\}$, output from multiplier 34, is:

$$Y(f) = X(f - f_c),$$

with components $$Y_r(f) = [1/2] \cdot [X(f-f_c) + X^*(f+f_c)], -N/2T < f < N/2T,$$

and $$Y_i(f) = [1/2j] \cdot [X(f-f_c) - X^*(f+f_c)], -N/2T < f < N/2T,$$

where $Y_r(f)$ and $Y_i(f)$ are the frequency spectra of $\{y_r(kT)\}$ and $\{y_i(kT)\}$, respectively. Thus, the output of real filter 58 has a spectrum: $Y_r(f)Q(f) = [Q(f)/2] \cdot [X(f-f_c) + X^*(f+f_c)]$, $-N/2T < f \leq N/2T$, and the output of imaginary filter 60 has a spectrum:

$$Y_i(f)\hat{Q}(f) = \begin{cases} [-Q(f)/2] \cdot [X(f-f_c) - X^*(f+f_c)], & 0 < f \leq N/2T, \\ [Q(f)/2] \cdot [X(f-f_c) - X^*(f+f_c)], & -N/2T < f < 0, \\ 0, & f = 0. \end{cases}$$

The frequency spectrum $S(f)$ of the sequence $\{s(kT/N)\}$ is given by:

$$S(f) = Y_r(f) \cdot Q(f) - Y_i(f) \cdot \hat{Q}(f), -N/2T < f \leq N/2T,$$

$$S(f) = \begin{cases} X(f-f_c) \cdot Q(f), & 0 < f \leq N/2T, \\ X^*(f+f_c) \cdot Q(f), & -N/2T < f < 0, \\ 0, & f = 0, \end{cases}$$

which is the desired modulated carrier signal.

Figure 5:
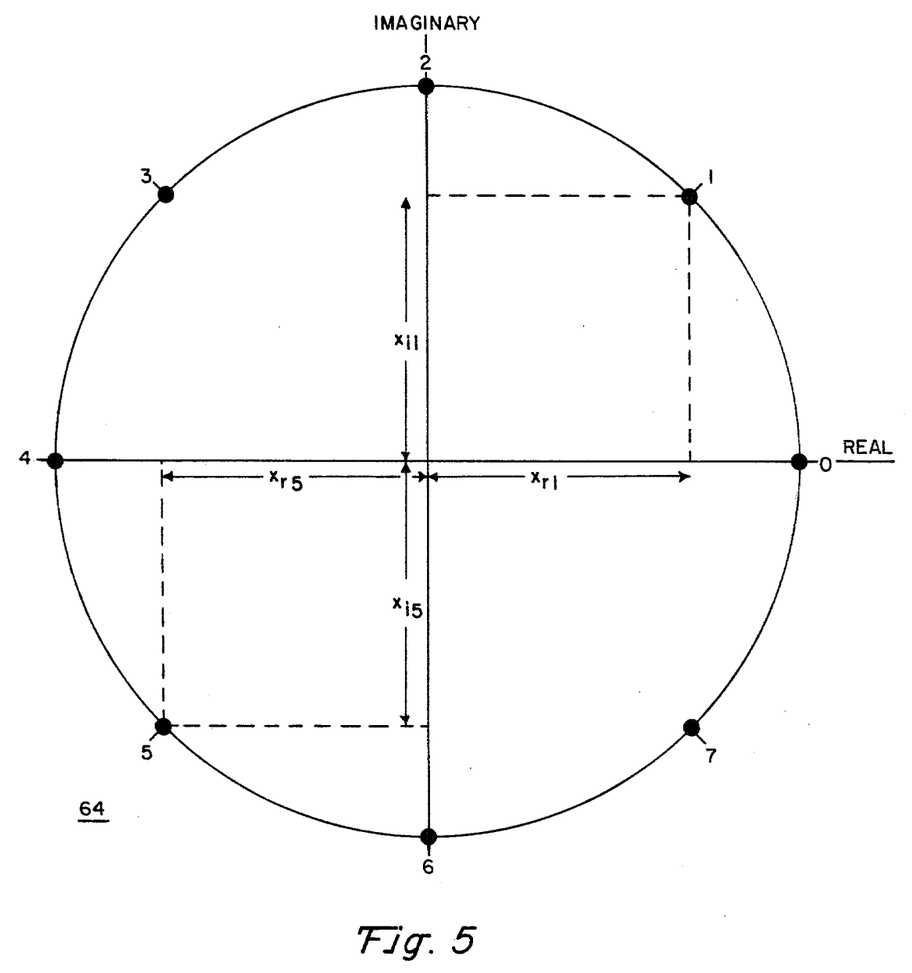
FIG. 5 shows an 8-phase signal structure transmitted by a first alternative embodiment of the invention.

We turn now to FIG. 5, which depicts a typical 8-phase signal structure and which will be used to explain certain concepts utilized in a first alternative embodiment of the invention.

An 8-phase modem signal constellation 64 has 8 signal points, equally deployed at a common distance from the origin and having an angular spacing of $2\pi/8$ radians (or 45°). The 8 signal points have been indicated as lying at absolute phase positions 0 through 7. It is well known in the art that such a signal constellation may be used to transmit 3 bits during each symbol interval, the digital data being encoded into the phase shifts occurring between one symbol interval and its successor, e.g., a phase shift of 90° could, for example, represent a "010" and, were point 7 the symbol transmitted during the previous symbol interval, point 1 would now be transmitted to convey the "010" information.

The prior art transmitter of FIG. 1 would carry out this illustrative process of transmitting the "010" (or 90°) phase shift as follows. Encoder 12, upon accepting the three bits "010" (and having stored internally the previous signal point 7), would perform what amounts to a modulo 8 addition of the 7 and the 2 (i.e., 2 phase positions equals 90°), to produce the desired current signal point 1, i.e., 7+2 mod 8=1.

Since, in a QAM transmitter, point 1 corresponds to (with reference to FIG. 5) imaginary and real components of $x_{r1}$ and $x_{i1}$, these symbol components would be generated (by logic internal to encoder 12) and supplied to filters 14 and 16, respectively, for subsequent filtering, modulation, etc.

Referring now to FIG. 3, if the transmitter structure depicted there is employed to generate a purely phase modulated signal (e.g., either the 8-phase structure of FIG. 5 or any other pure phase constellation with equally spaced symbol points) and, if the number of cycles of carrier frequency per symbol interval is given by $f_cT=n/2^m$, where n is any integer and $2^m$ is the number of phase changes in the signalling alphabet, then the modulated carrier samples y(kT) will be found to assume at most only $2^m$ possible complex values. Therefore, under these circumstances, modulation may be replaced by a table look-up procedure, i.e., each of the $2^m$ baseband symbols x(kT) maps into one of $2^m$ modulated carrier samples y(kT).

Since, as discussed above, a conventional phase encoder performs a mapping process, wherein for each m bits received, one of $2^m$ complex symbols is generated (the $2^m$ symbols generally being contained in memory and accessed by logic which performs a table look-up procedure), in a FIG. 3-like transmitter utilizing pure phase modulation, since $2^m$ possibilities exist for both x(kT) and y(kT), the separate table look-up procedures by which encoding and subsequent modulation would normally be implemented may be coalesced into a single combined table look-up operation.

Figure 6:
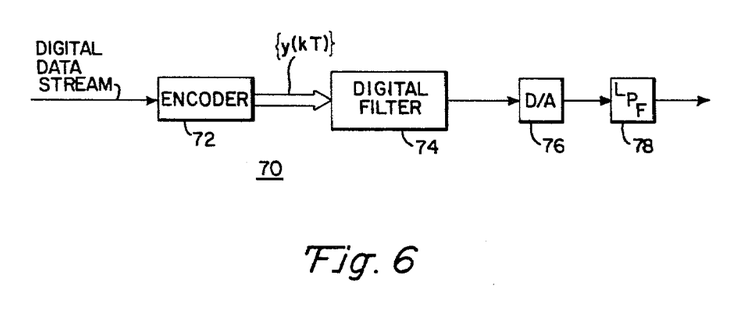
FIG. 6 is a block diagram of a first alternative embodiment of the invention.

This principle has been implemented in a transmitter 70 shown in FIG. 6; there, the carrier frequency $f_c$, symbol interval T and number of phase levels $2^m$ are given by $f_c=n/2^m$, where n is an integer, and the $2^m$ symbols x(kT) located in the conventional encoder look-up table have been replaced by the modulated carrier symbols y(kT).

An encoder 72 accepts a stream of digital data and, for each m bits, provides directly as output one of $2^m$ modulated carrier signal samples y(kT). A digital filter 74 (identical to circuit 59 of FIGS. 3 and 4), a D/A converter 76, and an analog low pass filter 78 (identical to converter 40 and low pass filter 42 of FIG. 2) subsequently process these modulated passband samples, as described above.

The pure phase mapping procedure of encoder 72 will now be described, assuming the signal constellation employed is the 8-phase structure of FIG. 5, the carrier frequency is 1800 Hz and the symbol rate is 1600 baud.

Under these conditions, $f_cT=9/8=n/2^m$ and there are, therefore, $2^m=8$ possible modulated carrier signals. A convenient way of conceptualizing the process performed by encoder 72 is to realize that $f_cT$ is the number of cycles which the carrier will go through, in one symbol interval, in the absence of any phase shift due to data modulation. In the particular case under discussion, the phase of the carrier will advance 45° (i.e., one-eighth of a cycle), in the absence of data modulation.

Referring to FIG. 5, we assume that the previous signal point transmitted was point 7 and that the current 3 bits of data call for a phase change of 225° or a 5 signal point advance. Adding, module 8, the 7, the 5 and the 1 signal point advance (i.e., 45°) due solely to the $f_cT=9/8$ relationship yields 5, i.e., 7+5+1 mod 8=5. Encoder 72 of FIG. 6, therefore, sends, to filter 74, the real and imaginary components of the complex modulated signal:

$$y(kT)=y_{r5}+jy_{i5}=[x_{r5}+jx_{i5}]\cdot\exp(j2\pi f_c kT),$$

where $x_{r5}$ and $x_{i5}$ are, respectively, the real and imaginary components of signal point 5 of signal structure 64.

Thus, whereas encoder 12 of the FIG. 1 prior art transmitter would, under these assumed circumstances, generate the components $x_{r5}$ and $x_{i5}$ (which would then require subsequent filtering and modulation), encoder 72 of the FIG. 6 transmitter structure, under the same circumstances, generates the already modulated carrier samples $y_{r5}$ and $y_{i5}$ (which require only subsequent filtering).

Figure 7:
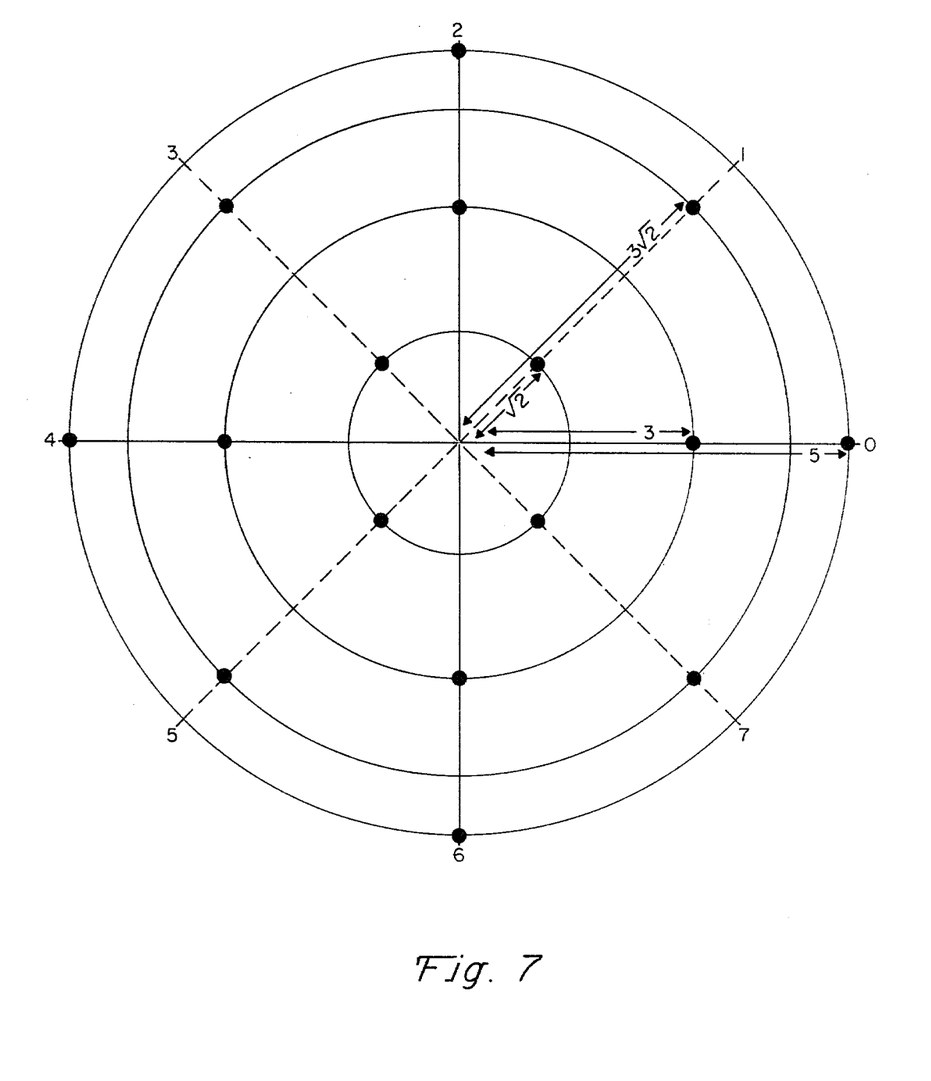
FIG. 7 shows a 16-point QAM signal structure transmitted by a second alternative embodiment of the invention.

We turn now to FIG. 7, which shows a typical 16-point quadrature amplitude (or combined phase and amplitude) modulation signal structure 90 and which will be used to explain how a second alternative embodiment of the invention can be employed to transmit a QAM signal. Signal structure 90 is, in fact, a signal structure which conforms to the current V.29 Recommendation of the C.C.I.T.T.

As is well known in the art, signal structure 90 may be employed to encode 4 bits of data into each symbol interval. Three bits determine the phase shift from the previous signal point (in a manner similar to that described above in conjunction with FIG. 5). The phase shift (and, thus, the absolute phase) having been determined, the final bit specifies the amplitude of the carrier, there being two distinct amplitudes associated with each absolute phase (a high and a low). It should be noted that signal structure 90 is of the class of signal constellations denoted as "dependent" phase and amplitude modulation, meaning that the amplitude of a signal point which is to be transmitted cannot be determined without knowledge of its phase. This is the most general type of signal constellation and is, therefore, used for illustration.

A conventional (i.e., as shown in FIG. 1) digital modem transmitter transmits structure 90 as follows. The phase position (0 through 7) of the previously sent signal point is added, modulo 8, to the number of phase positions by which the carrier is to be shifted (again 0 through 7), to encode 3 of the 4 bits to be transmitted.

The fourth bit determines which of the two signal points lying at the resultant phase position is to be transmitted, and encoder 12 produces and sends to filters 14 and 16 the real and imaginary components (i.e., $x_r(kT)$ and $x_i(kT)$) of the signal point selected.

Figure 8:
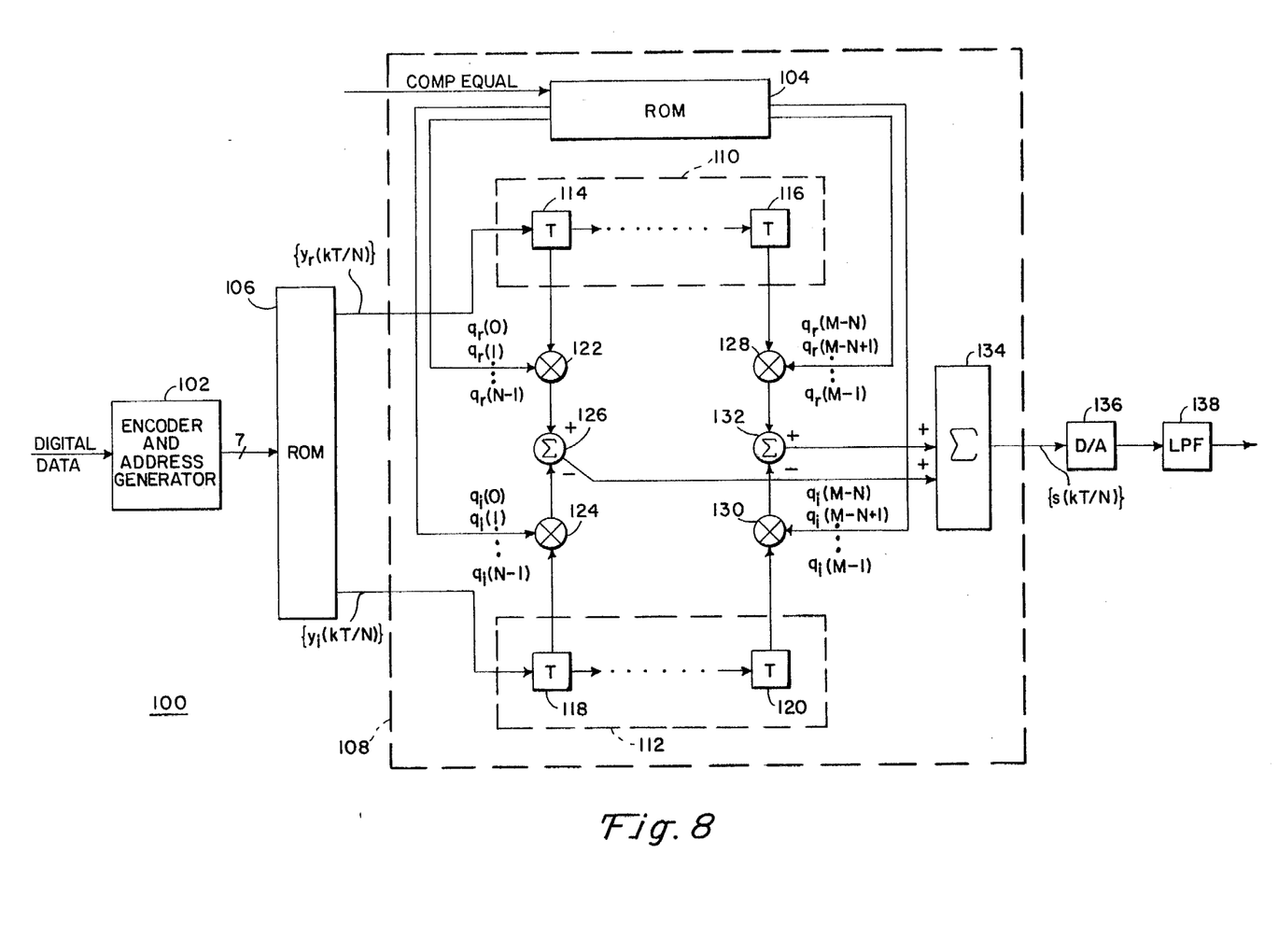
FIG. 8 is a block diagram of a second alternative embodiment of the invention.

Referring now to FIG. 8, a QAM transmitter 100, structured according to the invention, has an encoder and address generator 102, a ROM 106, digital filter 108, D/A converter 136, and low pass analog filter 138.

Transmitter 100 modulates a carrier frequency of 1700 Hz, at a symbol rate of 2400 baud, to transmit dependent QAM signal structure 90, of FIG. 7. However, these parameters are merely illustrative, since, as shown below, the concept embodied in transmitter 100 is applicable to a broad range of carrier frequencies, symbol rates, and signal structures.

With the parameters given above, the carrier phase will advance by 17 twenty-fourths of a cycle (or 255°) per symbol interval, in the absence of any carrier phase shift due to data modulation, i.e., the number of cycles of carrier per symbol interval, $f_cT$, is 17/24. Since 17 and 24 are relatively prime integers, the full 360 phase degrees of signal structure 90 may be pictured as being made up of increments of 15 degrees, each of which is one twenty-fourth of a full cycle of carrier. In the absence of any phase shift due to data modulation (i.e., pure carrier transmission), the phase of the transmitted signal advances by 17 of these 15 degree increments, each symbol interval, but the absolute phase of the signal can, at any time, correspond to only one of 24 phases, spaced equally throughout 360 degrees.

Referring back to FIG. 7, it will be seen that all the signal points of structure 90 also lie on one of these 24 phase positions, 45° being a multiple of 15°. Thus, after modulation by any of the 8 phase shifts possible in structure 90, the resultant signal can still assume only 1 of 24 discrete phases. Since there are, however, 4 possible amplitudes, the number of fully modulated carrier signals (i.e., modulated with 3 bits of phase and 1 bit of amplitude information) which may be produced is increased to 4·24=96.

As was the case with pure phase modulation discussed above, the generation of carrier signals, modulated in accordance with structure 90, may be conveniently conceptualized in terms of modulo addition. The phase of the previously sent signal will correspond to 1 of 24 possible phase positions, running from 0 through 23. To this is added one of the 8 possible numbers 0, 3, ..., 21, representing the phase (in multiples of 45° or 3 times 15°) advancement due to data modulation by 3 of the 4 current bits. Finally, the number 17, which corresponds to the phase process for pure carrier transmission, is added to form a total, which is then taken modulo 24, to yield the phase position of the current to-be-sent signal point. The fourth remaining bit to be transmitted (along with phase of the previously sent signal point, as described below) then specifies the amplitude, from which the real and imaginary components of the modulated carrier sample may be logically defined.

Referring again to FIG. 8, encoder and address generator 102, receives a stream of digital data and for 3 of each 4 bits received, performs the modulo 24 addition described immediately above. The resultant base-24 numbers (i.e., 0 through 23) determine 5 bits of a 7-bit address signal (via logic well known in the art), generated by encoder and address generator 102 and sent to ROM 106. The remaining 2 bits of the address signal are specified by the 4th bit of the group and the phase of the prior symbol as follows.

Referring momentarily back to FIG. 7, it will be seen that 4 pairs of signal points (i.e., the signal point pairs lying at phase positions 1, 3, 5, and 7) have absolute phases (with respect to phase position 0) which are an odd multiple of 45° and have high and low amplitudes of $3\sqrt{2}$ and $\sqrt{2}$, respectively. The remaining 4 pairs of signal points (i.e., those pairs located at phase positions 0, 2, 4, and 6) all have absolute phases which are even multiples of 45° and high and low amplitudes of 5 and 3, respectively. Thus, whether the absolute phase of a signal point is an even or odd multiple of 45° may be easily determined from its amplitude.

Let a binary variable $a_{k-1}$ denote whether the absolute phase of the previously sent signal point was an even or odd multiple of 45°, a 0 denoting the fact that the amplitude of the previously sent signal point was a 3 or a 5 (while its phase was, therefore, an even multiple of 45°), and a 1 indicating that the amplitude of the previously sent signal point was either $\sqrt{2}$ or $3\sqrt{2}$ (corresponding to a phase which is an odd multiple of 45°).

Further, let a second binary variable $b_k$ take the value 0, if the phase shift due to data modulation by the current to-be-sent signal point is an even multiple of 45°, and take the value 1, if the phase shift due to current data modulation is an odd multiple of 45°.

The binary variable $a_k$, yielded by the logical operation $a_k = a_{k-1}$ EXCLUSIVE OR $b_k$, then determines whether the phase of the current to-be-sent signal point is an even (i.e., $a_k=0$) or an odd (i.e., $a_k=1$) multiple of 45° and, consequently, whether the proper high and low amplitudes are 5 and 3 or $3\sqrt{2}$ and $\sqrt{2}$, respectively.

The binary variable $a_k$ thus becomes the sixth bit of the 7-bit address signal sent to ROM 106, while the seventh bit of the address signal determines whether a high or low amplitude will be sent at the resultant phase position.

ROM 106, once each symbol interval and in response to each consecutive 7-bit address, reads out 1 of 96 predetermined complex digital signals $y(kT) = y_r(kT) + jy_i(kT) = x(kT) \cdot \exp(j2\pi f_c kT)$ and provides the chosen modulated carrier sample to filter 108.

Filter 108 performs a function equivalent to that performed by circuit 59 of FIGS. 3 and 4; that is, it produces the real component of the complex output of filter 36 of FIG. 2. Its coefficients $q_r(mT/N)$ and $q_i(mT/N)$ are the same coefficients discussed above, in conjunction with FIGS. 2, 3 and 4. Filter 108 is, in fact, an alternative implementation of circuit 59. A choice between these two implementations is of little consequence, since they both require the same number of multiplications and additions during each symbol interval.

Within filter 108, $y_r(kT)$, the real component of $y(kT)$, enters a delay line 110, while $y_i(kT)$ ($y(kT)$'s imaginary component) is entered into a delay line 112. Delay lines 110 and 112 each contain M/N delay units (or [M/N] delay units, if M is not a multiple of N), with a time delay of T seconds being associated with each delay unit. In FIG. 8, only the first and last delay units are shown, i.e., delay units 114 and 116 are, respectively, the first and last delay units of delay line 110, while delay units 118 and 120 are, respectively, the first and last delay units of delay line 112.

Delay lines 110 and 112 operate in a manner similar to that described for delay lines 67 and 69 of FIG. 4. Once every T seconds, the real and imaginary values $y_r(kT)$ and $y_i(kT)$, provided by ROM 106, are sampled and entered into first delay units 114 and 118, respectively. All other samples are simultaneously shifted forward one delay unit, with the most ancient samples stored in delay units 116 and 120 being discarded each time. After each shifting operation, N consecutive outputs of filter 108 are obtained as follows. The sample value contained in each delay unit is multiplied, in the multiplier associated with that delay unit (e.g., multipliers 122, 124, 128, and 130, etc.), by the real or imaginary filter coefficient accessed from an additional read only memory (ROM) 104. The N sets of M/N filter coefficients which are provided to multipliers 122 through 128 are, respectively:

$$q_r(0), q_r(N), \ldots, q_r(M - N)$$
$$q_r(1), q_r(N + 1), \ldots, q_r(M - N + 1)$$
$$\vdots$$
$$q_r(N - 1), q_r(2N - 1), \ldots, q_r(M - 1),$$

while the N consecutive sets of M/N coefficients presented at multipliers 124 through 130 are, respectively:

$$q_i(0), q_i(N), \ldots, q_i(M - N)$$
$$q_i(1), q_i(N + 1), \ldots, q_i(M - N + 1)$$
$$\vdots$$
$$q_i(N - 1), q_i(2N - 1), \ldots q_i(M - 1).$$

Once every T/N seconds, M/N real and imaginary products are, therefore, produced. Each imaginary product is subtracted from the corresponding real product (e.g., in subtractors 126, 132, etc.), and the resulting partial sums are all accumulated in adder 134 to yield (once every T/N seconds) a filter 108 output.

As discussed above, since the coefficients q(mT/N) stored in and accessed from ROM 104 are complex, it is possible to provide compromise phase and amplitude equalization, with no attendant increase in computational complexity, by altering the coefficient values. Therefore, at least two sets of coefficient values are stored in ROM 104, one set of coefficients providing compromise equalization while the other does not. It is possible, of course, to store additional sets of coefficients. A control signal COMP EQUAL (activated, for example, from the modem control panel) determines which set of coefficients is activated.

In FIG. 8, ROM's 104 and 106 have been shown as being two separate and discrete devices. It should be noted, however, that they may in fact be merely separate sections of a single element.

The output of filter 108, the sample stream of the filtered modulated carrier wave, $\{s(kT/N)\}$, passes to D/A converter 136, which produces a corresponding analog signal, which is subsequently smoothed in low pass filter 138 to produce the desired line signal.

Figure 9:
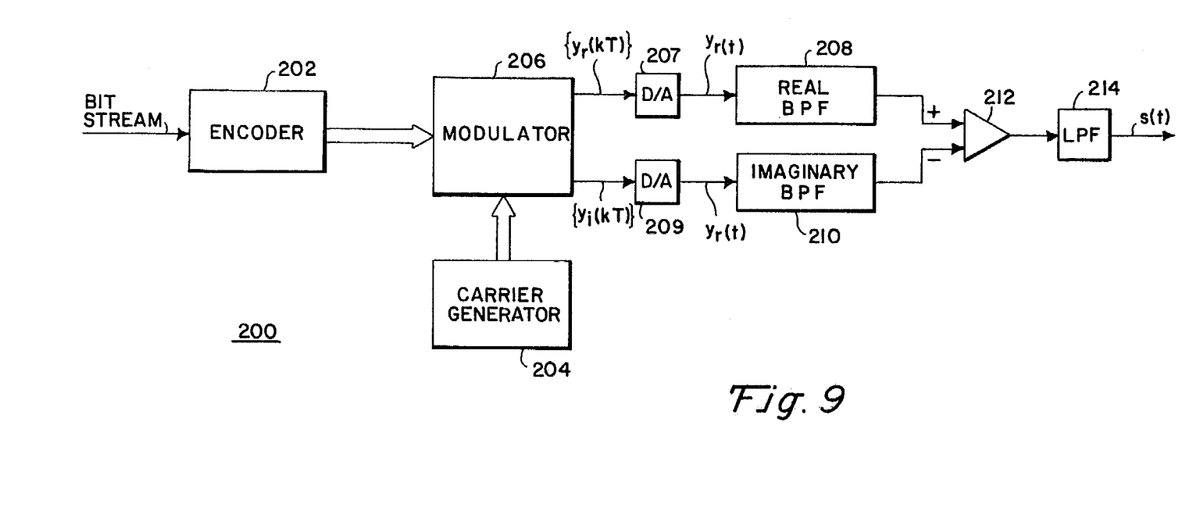
FIG. 9 is a block diagram of a third alternative embodiment of the invention.

It was pointed out above that it was sufficient that the real and imaginary filter pair utilized in the invention be a Hilbert transform pair, i.e., that the real filter have zero response to DC and that the impulse response of the imaginary filter be the Hilbert transform of the impulse response of the real filter. Whereas, so far, the invention has been characterized as utilizing digital filters, the concept is extendable to structures employing either analog or sampled-data filter pairs, providing digital-to-analog conversion is provided, prior to the signal stream reaching such filters. FIG. 9, to which we now turn, shows such a transmitter structure.

A transmitter 200 has an encoder 202, a complex carrier generator 204, and a complex modulator 206 which operate as shown and explained in conjunction with FIGS. 3 and 4 above, i.e., like encoder 30, carrier generator 32, and complex modulator 34. As a result of the operations of these various elements, two sample streams $\{y_r(kT)\}$ and $\{y_i(kT)\}$ are produced as outputs from modulator 206, which represent the real and imaginary components of successive samples of the modulated, but as yet unfiltered, carrier signal.

The component sample streams pass to two parallel D/A converters 207 and 209, where they are converted to corresponding analog signals (containing high frequency components, due to the conversion process) and thence to a parallel sampled-data bandpass filter pair, real filter 208 and imaginary filter 210. Filters 208 and 210 are "sampled-data" filters, in the sense that, while they sample the analog signals $y_r(t)$ and $y_i(t)$ at discrete instants of time, the amplitude of the sample taken is not digitally quantized. Filters 208 and 210 could be implemented, for example, using charge-coupled device (CCD) or switched-capacitor technology.

Filters 208 and 210 are further specified as forming a Hilbert transform pair and having, therefore, the response characteristics set forth above.

The outputs from filters 208 and 210 pass to a summing amplifier 212, where they are combined (in a subtractive manner) to form the desired line signal. A simple analog low pass filter 214 may be provided downstream of summing amplifier 212, if sampled-data filters 208 and 210 do not integrally provide for some high frequency suppression.

Other embodiments are within the following claims.

For example, an embodiment for QAM (or combined phase and amplitude modulation) has been described, with respect to the 16-point signal constellation shown in FIG. 7. In this particular signal structure, the individual signal points are chosen such that they all have one of four amplitude values, a condition which (in that structure) restricts the number of modulated carrier samples to 96. The concept underlying this embodiment may be stated in more general terms as follows. If the transmitter structure of FIG. 3 (i.e., a transmitter which multiplies complex baseband symbols by samples of a complex exponential, to produce samples of an unfiltered modulated carrier) is used to transmit a signal structure having $2^m$ signal points and, if the relationship of the carrier frequency $f_c$ and the symbol interval T is such that $f_c T = n/k$, where n and k are relatively prime integers, then it will be found that, at most, k times $2^m$ modulated carrier samples will ever be produced. In such a case, the means by which the modulation is carried out may be replaced by a data storage element, containing, at most, k times $2^m$ complex-valued entries. Thus, in accordance with this concept, transmitter 100 of FIG. 8 may be employed to transmit any QAM structure having $2^m$ signal points, if $f_c T = n/k$, where n and k are relatively prime integers, providing ROM 106 contains the necessary number of modulated carrier samples.

Where a relationship exists between the carrier frequency, symbol rate and signal structure (such as was described in connection with QAM structure 90 of FIG. 7 and transmitter 100 of FIG. 8), such that the phase shifts due to data modulation are a subset of the total number of symbol-to-symbol phase shifts due to pure carrier transmission and the symbol points do not all have different amplitudes, the number of modulated carrier samples which must be stored may be reduced to well below k times $2^m$.

Also, whereas the invention has been described with reference to QAM, combined phase and amplitude, and pure phase modulation schemes, certain aspects of it (particularly the replacement of a carrier generator and complex modulator with a combined encoder and address generator 102 and ROM 106, discussed in conjunction with FIG. 8) are applicable to amplitude modulation schemes. For AM transmission the output of encoder 30 of FIG. 2 or encoder and address generator 102 of FIG. 8 (i.e., x(kT)) is real-valued rather than complex. Complex modulation then shifts the baseband spectrum to passband, and filter coefficients q(mT/N) may be chosen so that any of the conventional AM line spectra, such as vestigial sideband, single sideband (including partial response), or double sideband AM result.

In the transmitter structure of FIG. 9, filters 208 and 210 could be an analog Hilbert transform filter pair, rather than the sampled-data filter pair described above. In such a case, low pass filter 214 could be eliminated, since filters 208 and 210, being analog, would inherently suppress high frequency components.

The transmitter structure of FIG. 9 could also, in the place of encoder 202, carrier generator 204 and modulator 206, incorporate instead encoder 72 of FIG. 6 (to transmit pure phase modulated signals when $f_cT=n/2^m$) or encoder and address generator 102 and ROM 106 of FIG. 8 (to transmit a QAM signal structure having $2^m$ signal points, where $f_cT=n/k$, n and k being relatively prime integers).

I claim:

1. A data modulator for transmitting a first sequence of data symbols at a symbol rate of 1/T, said modulator being characterized as having a carrier frequency of $f_c$ Hz and said data symbols being denoted x(kT), where x(kT) is a real or complex number and k is the time index of the kth symbol, comprising modulated signal generating means for receiving said first sequence and generating, in response thereto and at said symbol rate, a second sequence of complex-valued signals y(kT) said signal y(kT) representing the complex number $$y(kT)=x(kT)\cdot\exp(j2\pi f_c kT)$$

where $j=\sqrt{-1}$, and filter means for receiving said second sequence and generating, in response thereto, a third sequence of real-valued signals, at a rate higher than said symbol rate, said third sequence representing linear combinations of the real and imaginary parts of said second sequence of complex-valued signals y(kT).

2. A data modulator for transmitting a first sequence of data symbols at a symbol rate of 1/T, said modulator being characterized as having a carrier frequency of $f_c$ Hz and said data symbols being denoted x(kT), where x(kT) is a real or complex number and k is the time index of the kth symbol, comprising modulated signal generating means for receiving said first sequence and generating, in response thereto and at said symbol rate, a second sequence of complex-valued signals y(kT), said signal y(kT) representing the complex number $$y(kT)=x(kT)\cdot\exp(j2\pi f_c kT)$$

where $j=\sqrt{-1}$, means for converting said second sequence into a pair of analog signals representative of the real and imaginary parts of said second sequence, and filter means for thereafter filtering and combining said pair of analog signals to generate a composite analog signal, said composite analog signal representing a linear combination of said pair of analog signals.

3. The transmitter of claim 1 wherein said modulated signal generating means comprises means for generating successive complex-valued digital signals whose values are equal to successive samples of a complex exponential having a frequency equal to said carrier frequency, and means for multiplying successive signals of said first sequence with said successive complex exponential samples.

4. The transmitter of claim 2 wherein said modulated signal generating means comprises means for generating successive complex-valued digital signals whose values are equal to successive samples of a complex exponential having a frequency equal to said carrier frequency, and means for multiplying successive signals of said first sequence with said successive complex exponential samples.

5. The transmitter of claim 1 wherein said carrier frequency is $f_c$, $f_cT=n/k$, where n and k are relatively prime integers, each symbol of said first sequence of data symbols is one of a set of $2^m$ possible data symbols, each signal of said second sequence has one of no more than k times $2^m$ possible complex values, and said modulated signal generating means comprises means for storing no more than k times $2^m$ complex-valued digital signals and means for selecting, responsive to each data symbol of said first sequence, one of said stored complex-valued digital signals such that said selected digital signals consecutively form said second sequence.

6. The transmitter of claim 2 wherein said carrier frequency is $f_c$, $f_cT=n/k$, where n and k are relatively prime integers, each symbol of said first sequence of data symbols is one of a set of $2^m$ possible data symbols, each signal of said second sequence has one of no more than k times $2^m$ possible complex values, and said modulated signal generating means comprises means for storing no more than k times $2^m$ complex-valued digital signals and means for selecting, responsive to each data symbol of said first sequence, one of said stored complex-valued digital signals such that said selected digital signals consecutively form said second sequence.

7. The transmitter of claim 5 wherein only the phase of said carrier is modulated in accordance with said first sequence of data symbols, said carrier frequency signal is $f_c=n/2^m$, n being a positive integer and $2^m$ being the number of possible phase shifts of said carrier, each signal of said second sequence has one of no more than $2^m$ possible complex values, and said modulated signal generating means comprises means for storing said $2^m$ possible complex values and means for selecting, responsive to each data symbol of said first sequence, one of said $2^m$ possible complex values, said selected complex values consecutively forming said second sequence.

8. The transmitter of claim 6 wherein only the phase of said carrier is modulated in accordance with said first sequence of data symbols, said carrier frequency is $f_c = n/2^m$, n being a positive integer and $2^m$ being the number of possible phase shifts of said carrier, each signal of said second sequence has one of no more than $2^m$ possible complex values, and said modulated signal generating means comprises means for storing said $2^m$ possible complex values and means for selecting, responsive to each data symbol of said first sequence, one of said $2^m$ possible complex values, said selected complex values consecutively forming said second sequence.

9. The transmitter of claim 1, 3, 5 or 7 wherein said filter means is a complex digital filter and comprises
digital circuitry for successively storing a predetermined number of the most recent signals of said second sequence, multiplying the real components of said stored signals, respectively, by a predetermined number of a first set of coefficients, multiplying the imaginary components of said stored signals, respectively, by a predetermined number of a second set of coefficients, and combining the products of said multiplications to produce said third sequence of real-valued signals.

10. The transmitter of claim 2, 4, 6 or 8 wherein said filter means is a complex sampled-data filter, operates at discrete time intervals upon said pair of analog signals and comprises
means for sampling said pair of analog signals at successive discrete instants of time,
means for storing electrical charges whose magnitudes are representative of the amplitudes of a predetermined number of the most recent samples of said pair of analog signals at said instants of time, and
means for scaling the magnitudes of the real components of said stored charges, respectively, by a predetermined number of a first set of tap gains, scaling the magnitudes of the imaginary components of said stored charges, respectively, by a predetermined number of a second set of tap gains, and combining the products of said scaling operations to produce said composite analog signal.

11. The transmitter of claim 9 wherein the values of said first and second sets of coefficients are chosen such that the frequency spectrum of said third sequence has an amplitude characteristic that does not exhibit even symmetry about said carrier frequency.

12. The transmitter of claim 9 wherein the values of said first and second sets of coefficients are chosen such that the frequency spectrum of said third sequence has a phase characteristic that does not exhibit odd symmetry about said carrier frequency.

13. The transmitter of claim 11 further comprising means for selectively altering the values of said first and second sets of coefficients to cause said amplitude characteristic to exhibit even symmetry about said carrier frequency.

14. The transmitter of claim 12 further comprising means for selectively altering the values of said first and second sets of coefficients to cause said phase characteristic to exhibit odd symmetry about said carrier frequency.

15. The transmitter of claim 14 wherein said phase characteristic varies linearly with respect to frequency.

16. The transmitter of claim 9 wherein the phase characteristic of the frequency spectrum of said third sequence varies linearly with respect to frequency.

17. The transmitter of claim 10 wherein the values of said first and second sets of tap gains are chosen such that the frequency spectrum of said composite analog signal has an amplitude characteristic that does not exhibit even symmetry about said carrier frequency.

18. The transmitter of claim 10 wherein the values of said first and second sets of tap gains are chosen such that the frequency spectrum of said composite analog signal has a phase characteristic that does not exhibit odd symmetry about said carrier frequency.

19. The transmitter of claim 17 further comprising means for selectively altering the values of said first and second sets of tap gains to cause said amplitude characteristic to exhibit even symmetry about said carrier frequency.

20. The transmitter of claim 18 further comprising means for selectively altering the values of said first and second sets of tap gains to cause said phase characteristic to exhibit odd symmetry about said carrier frequency.

21. The transmitter of claim 20 wherein said phase characteristic varies linearly with respect to frequency.

* * * * *